United States Patent [19]

Schroeder et al.

[11] 4,251,640

[45] Feb. 17, 1981

[54] PROCESS FOR THE PREPARATION OF (CO)POLYMERIZABLE COMPOSITION

[75] Inventors: Arnold Schroeder, Deventer; Paulus G. J. Nieuwenhuis, Bathmen, both of Netherlands

[73] Assignee: Akzona Incorporated, Asheville, N.C.

[21] Appl. No.: 587,492

[22] Filed: Jun. 16, 1975

[30] Foreign Application Priority Data

Jun. 19, 1974 [NL] Netherlands .................. 7408182

[51] Int. Cl.³ .............................................. C08L 67/06
[52] U.S. Cl. ........................................ 525/17; 525/1; 525/5; 525/27; 528/274; 528/280
[58] Field of Search ............. 260/866, 45.95 F, 75 R; 525/1, 5, 17, 27; 528/274, 280

[56] References Cited

U.S. PATENT DOCUMENTS

| | | | |
|---|---|---|---|
| 2,698,312 | 12/1954 | Parker ................................. | 260/866 |
| 3,260,771 | 7/1966 | Stanley ................................ | 260/866 |
| 3,300,544 | 1/1967 | Parker, Jr. .......................... | 260/866 |
| 3,879,470 | 4/1975 | Munakata et al. ............ | 260/45.95 F |

*Primary Examiner*—J. Ziegler
*Attorney, Agent, or Firm*—Francis W. Young; Robert F. Green; Clelle W. Upchurch

[57] ABSTRACT

A polymerizable or copolymerizable unsaturated polyester composition contains a peroxide initiator and a compound of the formula:

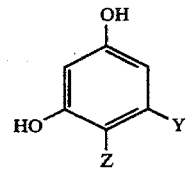

wherein Y is hydroxy, alkoxy having 1-12 carbon atoms, or alkyl having 1-12 carbon atoms, and Z is hydrogen, hydroxycarbonyl, alkyl, cycloalkyl, aralkyloxycarbonyl having 1-20 carbon atoms, benzoyl, or alkanoyl having 1-4 carbon atoms.

17 Claims, No Drawings

PROCESS FOR THE PREPARATION OF (CO)POLYMERIZABLE COMPOSITION

BACKGROUND OF THE INVENTION

The invention relates to a process for the preparation of a polymerizable or copolymerizable composition consisting of a polymerizable unsaturated polyester or a mixture of such an ester and a monomer copolymerizable therewith and a peroxide initiator, and to the polymerization or copolymerization of like mixtures and to articles entirely or substantially composed of (co)-polymerisates obtained by (co)polymerization of the compositions according to the invention.

Unsaturated polyesters may be obtained by reaction of approximately equivalent amounts of a polyvalent alcohol such as ethylene glycol, diethylene glycol, triethylene glycol, trimethylene glycol, propylene glycol, pentaerythritol and other diols or polyols with an unsaturated dibasic carboxylic acid or carboxylic anhydride such as maleic acid, maleic anhydride, fumaric acid, itaconic acid or citraconic acid. These unsaturated dibasic carboxylic acids or anhydrides are often used in combination with aromatic and/or saturated aliphatic dicarboxylic acids or the anhydrides derived therefrom, such as phthalic acid, phthalic anhydride, isophthalic acid, tetrachlorophthalic acid, malonic acid, adipic acid, sebacic acid, tartaric acid, etc.

Unsaturated polyesters containing vinyl group or vinylidene groups may be obtained by polycondensation of $\alpha,\beta$-unsaturated mono carboxylic acids such as acrylic or methacrylic acid, with mono-, di- or polyhydric alcohols. As examples of these alcohols may be mentioned: methanol, ethanol, isopropanol, cyclohexanol, phenol, ethylene glycol, propylene glycol, 2,2-bis(4-hydroxyphenyl)propane, 2,2-bis(4-hydroxycyclohexyl)propane, 2,2-bis(4-$\beta$-hydroxyethyloxyphenyl)-propane, pentaerythritol and dimers thereof, trimethol propane and glycerol, and the complex diols or polyols as described in the Netherlands Patent Application No. 6 808 040, the German Patent Application DAS No. 1 645 379, the U.S. Pat. Nos. 2,895,950 and 2,628,178, the British Pat. Nos. 928,307 and 965,826 and the French Pat. No. 1 404 000.

Unsaturated polyester containing vinyl groups or vinylidene groups also may be obtained by reacting $\alpha,\beta$-unsaturated monocarboxylic acids with compounds containing epoxy groups, such as bisphenol A bis (glycidyl ether).

The unsaturated polyesters required to this end may be dissolved in monomers copolymerizable with the polyester, which contain one or more $CH_2=C<$ groups such as styrene, vinyl toluene, methylmethacrylate, ethyleneglycolmethacrylate, etc.

The solutions that are used most are those that contain 70–50% by weight of unsaturated polyester and 30–50% by weight of copolymerizable monomer. Preference is given to styrene as copolymerizable monomer.

In order to improve the stability of the unsaturated polyesters, inhibitors are incorporated in them in amounts ranging from 0.001 to 0.03% by weight. The most commonly used inhibitors are hydroquinone, quinone and paratert.butyl catechol.

The above-described unsaturated polyester or mixtures thereof with copolymerizable monomers can be (co)polymerized under the influence of hydrogen peroxide and organic hydroperoxides, ketone peroxides and diacyl peroxides, that generate free radicals.

If this (co)polymerization is to be carried out at room temperature or at a slightly elevated temperature use should be made of combinations of the afore-mentioned peroxides and accelerators, such as organic metal compounds or a tertiary amine.

DESCRIPTION OF THE INVENTION

It has now been found that the peroxidic polymerization of an unsaturated polyester or the copolymerization of such an ester with a suitable monomer can be accelerated considerably if in addition to the peroxide initiator there is incorporated in the polyester or the polyester-monomer mixture a compound having the general formula:

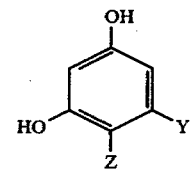

where Y is a hydroxy group, an alkoxy group or an alkyl group, having 1–12 C-atoms and Z represents hydrogen, a hydroxycarbonyl group, an alkyl group, cycloalkyl group, or aralkyloxy carbonyl group with 1–20 C-atoms, a benzoyl group, or an alkanoyl group, having 1–4 C-atoms, and the resulting composition is subsequently heated to the desired polymerization temperature.

As examples of compounds that may be used according to the invention may be mentioned:

floroglucinol; mono- and dialkyl ethers of floroglucinol, such as floroglucinol monomethyl ether, floroglucinol dimethyl ether, floroglucinolmonolauryl ether; 3,5-dihydroxy alkyl benzenes, such as 3,5-dihydroxy toluene, 3,5-dihydroxyisopropyl benzene; 2,4,6-trihydroxy benzoic acid; 2,4,6-trihydroxy(cyclo)alkyl benzoates such as 2,4,6-trihydroxy methyl benzoate, lauryl 2,4,6-trihydroxy benzoate, 4-t.butylcyclohexyl-2,4,6-trihydroxy benzoate, benzyl-2,4,6-trihydroxy benzoate; 2,4,6-trihydroxy phenyl ketones, such as 2,4,6-trihydroxy-acetophenone, 2,4,6-trihydroxybutyrophenone and 2,4,6-trihydroxybenzophenone.

The compounds according to the invention can be used in amounts ranging from 0.01 to 5.0% by weight, and preferably from 0.05 to 2.0% by weight, calculated on the polymer to be polymerized or the polymer monomer mixture to be copolymerized.

As initiators for the polymerization or copolymerization may be used hydrogen peroxide; ketone peroxides, such as acetylacetone peroxide, methylethylketone peroxide, cyclohexanone peroxide and methylisobutylketone peroxide; diacyl peroxide, such as benzoyl peroxide; peresters, such as tert.-butyl peroxide-2-ethyl hexanoate; perketals, such as 1,1-ditert.-butylperoxy-3,3,5-trimethyl cyclohexane and dialkyl peroxides, such as 1,3-bis(tert.-butylperoxyisopropyl)benzene.

If the (co)polymerization is to be carried out at room temperature or at slightly elevated temperature, tertiary amines, such as N,N-diethyl aniline, N,N-dimethyl toluidine or N,N-diethyl aniline or metal compounds are to be used as an accelerator. As metal compounds may be used organic cobalt, iron, copper, vanadium, cerium, manganese, tin, silver and mercury compounds and preferably cobalt naphthenate and cobalt octoate.

DESCRIPTION OF THE PREFERRED EMBODIMENTS

The invention will be further illustrated in the following examples. In these examples the gel time was determined by introducing mixtures in a test tube which was placed in a thermostatted bath of 20° C. and measuring the time elapsed between the preparation of these mixtures and their gelling moment. The curing at room temperature was measured with the aid of a Persoz hardness tester on unsaturated-polyester sheets having a thickness of 1 mm. During curing these sheets were covered with tin foil to prevent evaporation of the monomer, if present, and/or to prevent inhibition of atmospheric oxygen.

The (co)polymerization at elevated temperature was followed by placing a thermocouple in a sample present in a thermostatted bath of the desired temperature and recording the change of temperature with time. From the temperature-time curve thus obtained the minimum cure time and the time to peak exotherm were determined.

By minimum cure time is to be understood the time needed for the sample to reach a particular hardness; by peak exotherm is to be understood the highest temperature reached.

The test were carried out on the following samples:
Sample A:
the reaction product of 1.0 mole of maleic anhydride, 1.0 mole of phthalic anhydride, 1.1 moles of ethylene glycol and 1.1 moles of propane-1,2-diol made up with styrene to a styrene content of 35%.
Sample B:
the reaction product of 2 moles of bisphenol A bis (glycidyl ether) and 2 moles of methylmethacrylate made up with styrene to a styrene content of 45%.

EXAMPLE I

To 100 parts by weight of Sample A were added 0.5 parts by weight of a solution of cobalt naphthenate in dimethylphthalate containing 1% by weight of cobalt, 1 part by weight of hydrogen peroxide with an active O-content of 4% and 0.08 parts by weight of floroglucinol. Of the resulting composition the gel time at 20° C. and the Persoz hardness after 2, 6 and 24 hours were determined. The same measurements were done on a composition which did not contain floroglucinol and on compositions containing different amounts of accelerator.

The various compositions used and the gel times and hardness values measured are given in the following table.

TABLE I

| Sample A | 100 | 100 | 100 | 100 | 100 | 100 | 100 | 100 | 100 | 100 |
|---|---|---|---|---|---|---|---|---|---|---|
| Cobalt accelerator | 1 | 0.5 | 0.5 | 0.5 | 1 | 1 | 1 | 2 | 2 | 2 |
| Hydrogen peroxide | 1 | 1 | 1 | 1 | 1 | 1 | 1 | 1 | 1 | 1 |
| Floroglucinol | — | 0.08 | 0.16 | 0.32 | 0.08 | 0.16 | 0.32 | 0.08 | 0.16 | 0.32 |
| Geltime at 20° C. in min | 6 | 8 | 6 | 4.6 | 5.0 | 4.0 | 3.3 | 2.4 | 2.4 | 1.8 |
| Persoz hardness | | | | | | | | | | |
| after 2 hours | — | 64 | 90 | 108 | 85 | 101 | 141 | 81 | 108 | 145 |
| after 6 hours | 26 | 103 | 122 | 139 | 115 | 138 | 160 | 111 | 136 | 164 |
| after 24 hours | 71 | 149 | 160 | 175 | 154 | 171 | 189 | 151 | 171 | 194 |

EXAMPLE II

To 100 parts by weight of sample A were added 1 part by weight of the cobalt accelerator described in Example I, 1 part by weight of hydrogen peroxide with an active O-content of 4% and 0.35 parts by weight of floroglucinol monomethyl ether. Of the resulting composition the gel time at 20° C. and the Persoz hardness after 2, 4 and 24 hours were determined.

The same measurements were carried out on composition which contained no compounds according to the invention or other compounds according to the invention.

The various compositions prepared and the gel times and hardness values measured are given in the following table.

TABLE II

| Sample A | 100 | 100 | 100 | 100 | 100 | 100 | 100 | 100 | 100 | 100 | 100 | 100 | 100 | 100 |
|---|---|---|---|---|---|---|---|---|---|---|---|---|---|---|
| Cobalt accelerator | 1 | 1 | 1 | 1 | 1 | 1 | 1 | 1 | 1 | 1 | 1 | 1 | 1 | 1 |
| Hydrogen peroxide | 1 | 1 | 1 | 1 | 1 | 1 | 1 | 1 | 1 | 1 | 1 | 1 | 1 | 1 |
| Floroglucinol monomethyl ether | — | 0.35 | — | — | — | — | — | — | — | — | — | — | — | — |
| Floroglucinol dimethyl ether | — | — | 0.39 | — | — | — | — | — | — | — | — | — | — | — |
| Floroglucinol monolauryl ether | — | — | — | 0.74 | — | — | — | — | — | — | — | — | — | — |
| 3,5-dihydroxytoluene | — | — | — | — | 0.31 | — | — | — | — | — | — | — | — | — |
| 2,4,6-trihydroxy benzoic acid | — | — | — | — | — | 0.43 | — | — | — | — | — | — | — | — |
| 2,4,6-trihydroxy methyl benzoate | — | — | — | — | — | — | 0.46 | — | — | — | — | — | — | — |
| Lauryl-2,4,6-trihydroxy-benzoate | — | — | — | — | — | — | — | 0.85 | — | — | — | — | — | — |
| 4-t.-butylcyclohexyl-2,4,6-trihydroxybenzoate | — | — | — | — | — | — | — | — | 0.77 | — | — | — | — | — |
| Benzyl-2,4,6-trihydroxy-benzoate | — | — | — | — | — | — | — | — | — | 0.65 | — | — | — | — |
| 2,4,6-trihydroxy-acetophenone | — | — | — | — | — | — | — | — | — | — | 0.42 | — | — | — |
| 2,4,6-trihydroxy benzophenone | — | — | — | — | — | — | — | — | — | — | — | 0.58 | — | — |

TABLE II-continued

| Sample A | 100 | 100 | 100 | 100 | 100 | 100 | 100 | 100 | 100 | 100 | 100 | 100 | 100 | 100 |
|---|---|---|---|---|---|---|---|---|---|---|---|---|---|---|
| 2,4,6-trihydroxy butyrophenone | — | — | — | — | — | — | — | — | — | — | — | — | 0.49 | — |
| 3,5-dihydroxyisopropyl benzene | — | — | — | — | — | — | — | — | — | — | — | — | — | 0.38 |
| Gel time at 20° C. (in min) | 6 | 4 | 4 | 3 | 6 | 1 | 5 | 4 | 5 | 3 | 4 | 4 | 5 | 7 |
| Persoz hardness | | | | | | | | | | | | | | |
| after 2 hours | — | 141 | 118 | 150 | 103 | 130 | 26 | 38 | 30 | 70 | 80 | 89 | 64 | 96 |
| after 6 hours | 26 | 161 | 144 | 172 | 147 | 150 | 55 | 65 | 61 | 120 | 111 | 117 | 105 | 132 |
| after 24 hours | 71 | 196 | 184 | 203 | 188 | 181 | 107 | 130 | 123 | 174 | 155 | 158 | 160 | 170 |

EXAMPLE III

To 100 parts by weight of Sample A were added 1 part by weight of the cobalt accelerator described in Example I, 1 part by weight of acetylacetone peroxide and 0.08 parts by weight of floroglucinol. Of the resulting composition the gel time at 20° C. and the Persoz hardness after 2, 6 and 24 hours were determined.

The same measurements were done on compositions not containing floroglucinol or containing floroglucinol in a different amount. The same measurements were also carried out on compositions containing a peroxide other than acetylacetone peroxide.

The compositions prepared and the measured gel times and hardness values are listed in the following table.

TABLE III

| Sample A | 100 | 100 | 100 | 100 | 100 | 100 | 100 | 100 | 100 | 100 | 100 | 100 |
|---|---|---|---|---|---|---|---|---|---|---|---|---|
| Cobalt accelerator | 1 | 1 | 1 | 1 | 1 | 1 | 1 | 1 | 1 | 1 | 1 | 1 |
| Acetyl acetone peroxide (4.0% AO) | 1 | 1 | 1 | — | — | — | — | — | — | — | — | — |
| Methylethyl ketone peroxide (9.0% AO) | — | — | — | 1 | 1 | 1 | — | — | — | — | — | — |
| Cyclohexane peroxide (6.5% AO) | — | — | — | — | — | — | 1 | 1 | 1 | — | — | — |
| Methylisobutyl ketone peroxide (10.2% AO) | — | — | — | — | — | — | — | — | — | 1 | 1 | 1 |
| Floroglucinol | — | 0.08 | 0.32 | — | 0.08 | 0.32 | — | 0.08 | 0.32 | — | 0.08 | 0.32 |
| Gel time (in min) 20° C. | 15 | 9 | 8 | 15 | 7 | 6 | 54 | 27 | 17 | 47 | 11 | 7 |
| Persoz hardness | | | | | | | | | | | | |
| after 2 hours | 73 | 100 | 122 | 33 | 68 | 101 | 27 | 48 | 65 | — | 45 | 68 |
| after 6 hours | 127 | 149 | 168 | 80 | 115 | 132 | 68 | 106 | 112 | 59 | 109 | 125 |
| after 24 hours | 169 | 178 | 210 | 136 | 167 | 182 | 132 | 162 | 171 | 135 | 163 | 177 |

EXAMPLE IV

To 100 parts by weight of sample B were added 1 part by weight of the accelerator described in Example I, 1 part by weight of acetylacetone peroxide and 0.8 parts by weight of floroglucinol. Subsequently, the gel time at 20° C. and the Persoz hardness after 2, 4 and 24 hours were determined. The same measurements were carried out on compositions which contained no floroglucinol or 0.32 parts by weight of floroglucinol and/or other peroxides.

The resulting compositions and the measured gel times and the hardness values are shown in the following table.

TABLE IV

| Sample B | 100 | 100 | 100 | 100 | 100 | 100 | 100 | 100 | 100 | 100 | 100 | 100 |
|---|---|---|---|---|---|---|---|---|---|---|---|---|
| Cobalt accelerator | 1 | 1 | 1 | 1 | 1 | 1 | 1 | 1 | 1 | 1 | 1 | 1 |
| Acetyl acetone peroxide (4.0% AO) | 1 | 1 | 1 | — | — | — | — | — | — | — | — | — |
| Methylethyl ketone peroxide (9.0% AO) | — | — | — | 1 | 1 | 1 | — | — | — | — | — | — |
| Cyclohexanone peroxide (5.5% AO) | — | — | — | — | — | — | 1 | 1 | 1 | — | — | — |
| Methylisobutyl ketone peroxide (10.2% AO) | — | — | — | — | — | — | — | — | — | 1 | 1 | 1 |
| Floroglucinol | — | 0.08 | 0.32 | — | 0.08 | 0.32 | — | 0.08 | 0.32 | — | 0.08 | 0.32 |
| Gel time (in min) | 1440 | 32 | 8 | 180 | 20 | 9 | — | 11 | 8 | 119 | 19 | 10 |
| Persoz hardness | | | | | | | | | | | | |
| after 2 hours | — | 128 | 203 | — | 111 | 202 | — | 151 | 203 | — | 126 | 179 |
| 6 hours | — | 203 | 251 | 20 | 197 | 258 | — | 210 | 255 | 55 | 204 | 239 |
| 24 hours | — | 269 | 298 | 205 | 270 | 284 | — | 266 | 284 | 198 | 271 | 294 |

EXAMPLE V

To 100 parts by weight of sample A were added 2 parts by weight of a benzoyl peroxide paste composed of 50% by weight of benzoyl peroxide and 50% by weight of softener and 0.08 parts by weight of floroglucinol. Subsequently, at a temperature of 70° C., the gel time, the minimum cure time, the time to peak exotherm, and the peak exotherm were determined. The same measurements were carried out on compositions which are listed in the following table.

TABLE V

| Sample A | 100 | 100 | 100 | 100 | 100 | 100 | 100 | 100 | 100 | 100 | 100 | 100 |
|---|---|---|---|---|---|---|---|---|---|---|---|---|
| Benzoyl peroxide paste (50% -) | 2 | 2 | 2 | — | — | — | — | — | — | — | — | — |
| Tert. butyl-per-2-ethylexanoate | — | — | — | 1 | 1 | 1 | — | — | — | — | — | — |
| 1,1-di-tert-butyl-peroxy-3,3,5-trimethylcyclohexane (50% -) | — | — | — | — | — | — | 2 | 2 | 2 | — | — | — |
| 1,3-bis (tert. butyl peroxy-isopropyl) benzene | — | — | — | — | — | — | — | — | — | 1 | 1 | 1 |
| Floroglucinol | — | 0.08 | 0.32 | — | 0.08 | 0.32 | — | 0.08 | 0.32 | — | 0.08 | 0.32 |
| Bath temperature (°C.) | 70 | 70 | 70 | 70 | 70 | 70 | 70 | 70 | 70 | 100 | 100 | 100 |
| Gel time (min) | 12.7 | 5.8 | 5.8 | 12.8 | 6.7 | 6.3 | 19.9 | 10.9 | 12.9 | 17.4 | 4.6 | 3.5 |
| Minimum cure time (min) | 13.5 | 8.9 | 9.8 | 15.5 | 9.5 | 9.5 | 24.4 | 15.4 | 19.6 | 19.7 | 7.1 | 6.9 |
| Time to peak exotherm (min) | 18.9 | 12.3 | 13.3 | 18.7 | 12.7 | 12.3 | 27.1 | 18.4 | 22.4 | 21.6 | 9.9 | 9.6 |
| Peak exotherm (°C.) | 227 | 223 | 211 | 229 | 229 | 221 | 223 | 220 | 212 | 238 | 261 | 248 |

EXAMPLE VI

Of compositions listed in Table VI the gel time, the minimum cure time, the time to peak exotherm and the peak exotherm were determined in the way described in Example V. The results obtained are also included in this table.

TABLE VI

| Sample B | 100 | 100 | 100 | 100 | 100 | 100 | 100 | 100 | 100 | 100 | 100 | 100 |
|---|---|---|---|---|---|---|---|---|---|---|---|---|
| Benzoyl peroxide paste (50% -) | 2 | 2 | 2 | — | — | — | — | — | — | — | — | — |
| Tert. butylper-2-ethyl hexanoate | — | — | — | 1 | 1 | 1 | — | — | — | — | — | — |
| 1,1-ditert-butyl-peroxy-3,3,5-trimethylcyclohexane (50% -) | — | — | — | — | — | — | 2 | 2 | 2 | — | — | — |
| 1,3-bis (tert. butylperoxy-isopropyl) benzene | — | — | — | — | — | — | — | — | — | 1 | 1 | 1 |
| Floroglucinol | — | 0.08 | 0.32 | — | 0.08 | 0.32 | — | 0.08 | 0.32 | — | 0.08 | 0.32 |
| Bath temperature (°C.) | 80 | 80 | 80 | 80 | 80 | 80 | 90 | 90 | 90 | 110 | 110 | 110 |
| Gel time (min) | 13.5 | 6.5 | — | 20.6 | 14.8 | 10.1 | 28.2 | 17.5 | 12.0 | 17.7 | 7.7 | 6.6 |
| Minimum cure time (min) | 16.9 | 9.8 | — | 22.9 | 17.2 | 13.1 | 30.6 | 20.2 | 16.0 | 21.2 | 10.6 | 9.0 |
| Time to peak exotherm (min) | 19.6 | 12.7 | 12.0 | 26.1 | 20.4 | 16.1 | 34.0 | 23.5 | 19.4 | 23.5 | 13.2 | 11.4 |
| Peak exotherm (°C.) | 202 | 199 | 83 | 211 | 214 | 198 | 228 | 221 | 217 | 251 | 253 | 252 |

The invention is not limited to the afore-described examples, the scope of the invention allowing of many variants.

The cured unsaturated polyester/monomer mixture thus obtained can be used e.g. for the manufacture of casings for refrigerators, automobile parts, articles for the electronic industry, glass reinforced pipes, drains, tanks and the like.

What is claimed is:

1. In a process for the preparation of a polymerizable or copolymerizable composition containing a polymerizable unsaturated polyester and a peroxide initiator, the method of improving the acceleration of the polymerization which comprises incorporating in said composition a compound of the formula:

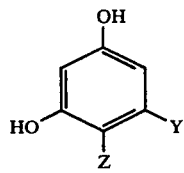

wherein Y is selected from the group consisting of hydroxy, alkoxy having 1-12 carbon atoms, and alkyl having 1-12 carbon atoms, and Z is selected from the group consisting of hydrogen, hydroxycarbonyl, alkyl, cycloalkyl, aralkyloxycarbonyl having 1-20 carbon atoms, benzoyl, and alkanoyl having 1-4 carbon atoms.

2. The process of claim 1 in which at least one of the compounds of said formula is incorporated in said composition in an amount in the range of about 0.01% to about 5.0% by weight, calculated on the polyester to be polymerized.

3. The process of claim 1 in which said composition further includes a monomer copolymerizable with said polyester.

4. The process of claim 1 in which said composition further includes an accelerator.

5. The process of claim 4 in which the accelerator is a cobalt carboxylate.

6. The process of claim 4 in which the accelerator is cobalt naphthenate.

7. A polymerizable or copolymerizable composition characterized by accelerated polymerization comprising a polymerizable unsaturated polyester, a peroxide initiator, and a compound of the formula:

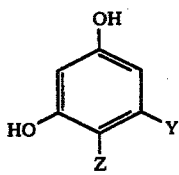

wherein Y is selected from the group consisting of hydroxy, alkoxy having 1-12 carbon atoms, and alkyl having 1-12 carbon atoms, and Z is selected from the group consisting of hydrogen, hydroxycarbonyl, alkyl, cycloalkyl, aralkyloxycarbonyl having 1-20 carbon atoms, benzoyl, and alkanoyl having 1-4 carbon atoms.

8. The composition of claim 7 which further includes a monomer copolymerizable with said polyester.

9. The composition of claim 7 which includes an accelerator.

10. The composition of claim 7 which includes at least one of the compounds of said formula in an amount in the range of about 0.01% to about 5.0% by weight, calculated on the polyester to be polymerized.

11. The composition of claim 8 which includes at least one of the compounds of said formula in an amount in the range of about 0.01% to about 5.0% by weight, calculated on the polyester/monomer mixture to be copolymerized.

12. The composition of claim 9 in which the accelerator is a cobalt carboxylate.

13. The composition of claim 9 in which the accelerator is cobalt naphthenate.

14. A process for the accelerated polymerization of an unsaturated polyester which comprises polymerizing an unsaturated polyester in the presence of a peroxide initiator and a compound of the formula:

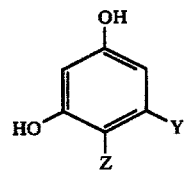

wherein Y is selected from the group consisting of hydroxy, alkoxy having 1-12 carbon atoms, and alkyl having 1-12 carbon atoms, and Z is selected from the group consisting of hydrogen, hydroxycarbonyl, alkyl, cycloalkyl, aralkyloxycarbonyl having 1-20 carbon atoms, benzoyl, and alkanoyl having 1-4 carbon atoms, at a temperature not higher than 150° C.

15. The process of claim 14 in which there is present monomer copolymerizable with said polyester.

16. A shaped article consisting essentially of the product of the process of claim 14.

17. A shaped article consisting essentially of the product of the process of claim 15.

* * * * *